United States Patent [19]

Emmons et al.

[11] Patent Number: 4,918,718
[45] Date of Patent: Apr. 17, 1990

[54] QUADRATURE AMPLITUDE MODULATION WITH LINE SYNCHRONIZATION PULSE FOR VIDEO TELEPHONE

[75] Inventors: Lawrence D. Emmons; Gary Fletcher, Jr., both of Grass Valley, Calif.

[73] Assignee: Luma Telecom, Inc., Sunnyvale, Calif.

[21] Appl. No.: 212,549

[22] Filed: Jun. 28, 1988

[51] Int. Cl.[4] .................... H04M 11/00; H04L 27/20; H04L 27/22
[52] U.S. Cl. ........................ 379/53; 379/93; 379/98; 379/100; 375/39; 358/13; 358/85; 358/141; 358/469
[58] Field of Search .................. 358/13, 85, 133, 138, 358/141, 469; 379/53, 93, 97, 98, 100; 375/39

[56] References Cited
U.S. PATENT DOCUMENTS 3,517,117  6/1970  Woodbury ............... 358/262.1
4,544,945 10/1985  Lewis, Jr. et al. ........... 358/13
4,562,467 12/1985  Bradley ................. 358/138
4,739,413  4/1988  Meyer .................. 358/141
4,780,884 10/1988  Karabinis ............... 375/39

Primary Examiner—Jin F. Ng
Assistant Examiner—Wing F. Chan
Attorney, Agent, or Firm—Townsend and Townsend

[57] ABSTRACT

The present invention assigns amplitudes of sine wave cycles in a data packet on I and Q channels of a QAM signal to color, gray or luminance values. Overlapping sine wave cycles on the I and Q channels in the data packet are assigned to the same or neighboring pixels. A synchronizing signal is sent at the beginning of each transmission of a packet. The synchronizing signal is a plurality of cycles at a maximum amplitude on the I and Q channels. The synchronizing signal serves two functions simultaneously. First, it is used to indicate the beginning of a new packet. Second, the phase of the synchronizing signal is used to initialize the demodulator phase detecting circuitry.

11 Claims, 7 Drawing Sheets

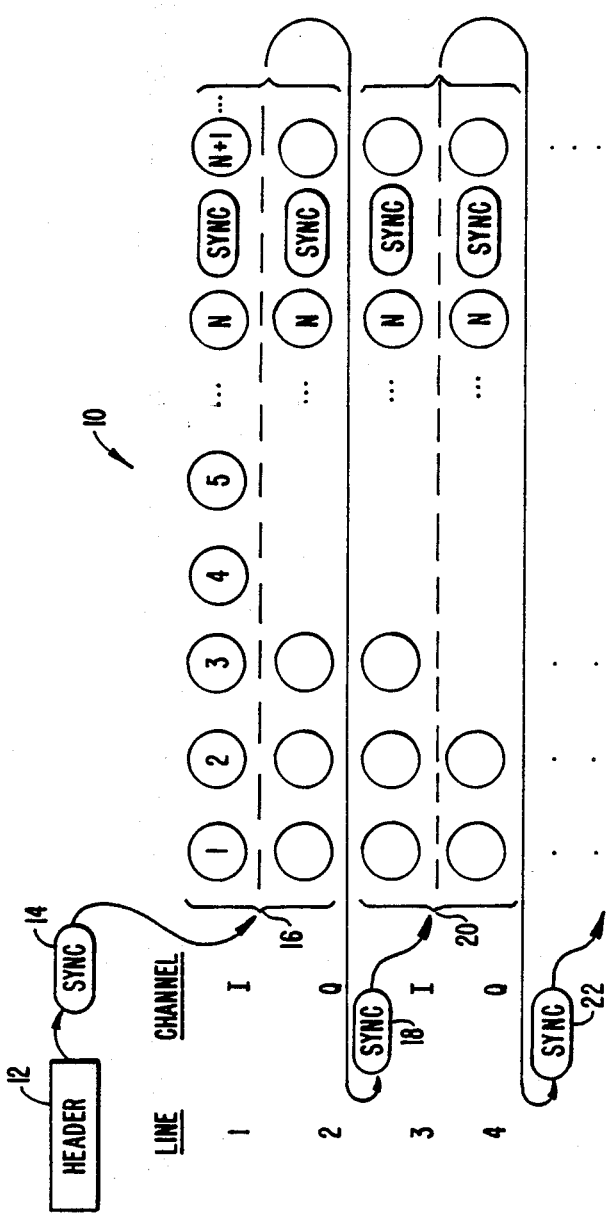
FIG._1A.
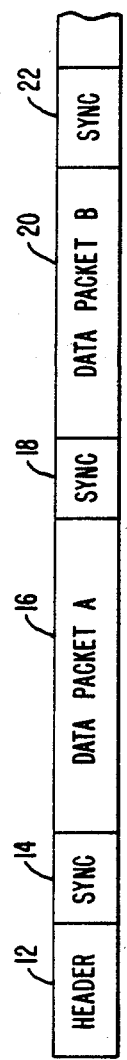
FIG._1B.

COLOR DIFFERENCE DATA AVERAGING PICTURE (160H × 100V)

| | A | | B | | C | | D | | |
|---|---|---|---|---|---|---|---|---|---|
| LINE X | ① | ② | ③ | ④ | ⑤ | ⑥ | ⑦ | ⑧ | ⑨ |
| LINE Y | ⑯① | ⑯② | ⑯③ | ⑯④ | ⑯⑤ | ⑯⑥ | ⑯⑦ | ⑯⑧ | ⑯⑨ |
| | ③②① | ③②② | ... | | | | | | |

COLOR DATA CALCULATIONS -

LUMINANCE Y: 160 × 100
COLOR DIFFERENCE R-Y: 80 × 50
B-Y: 80 × 50

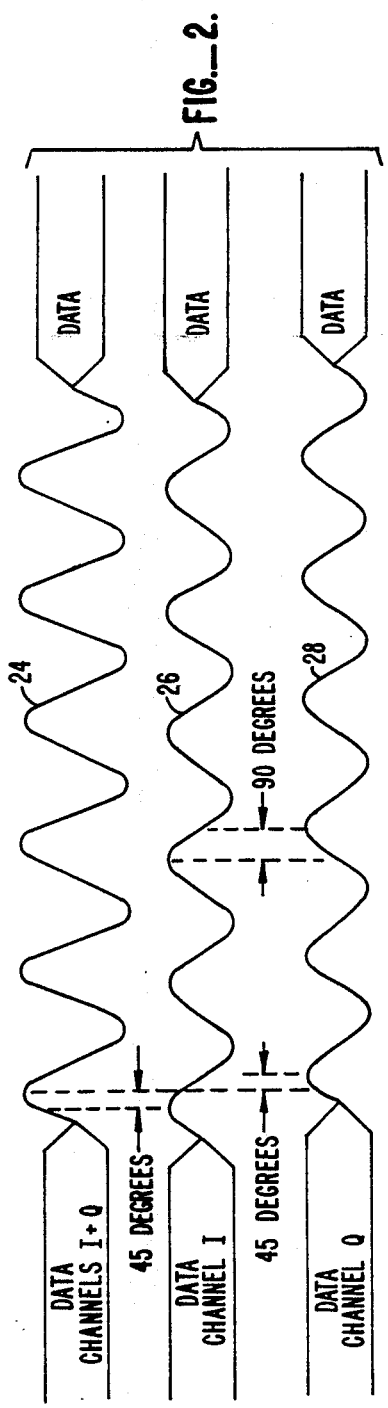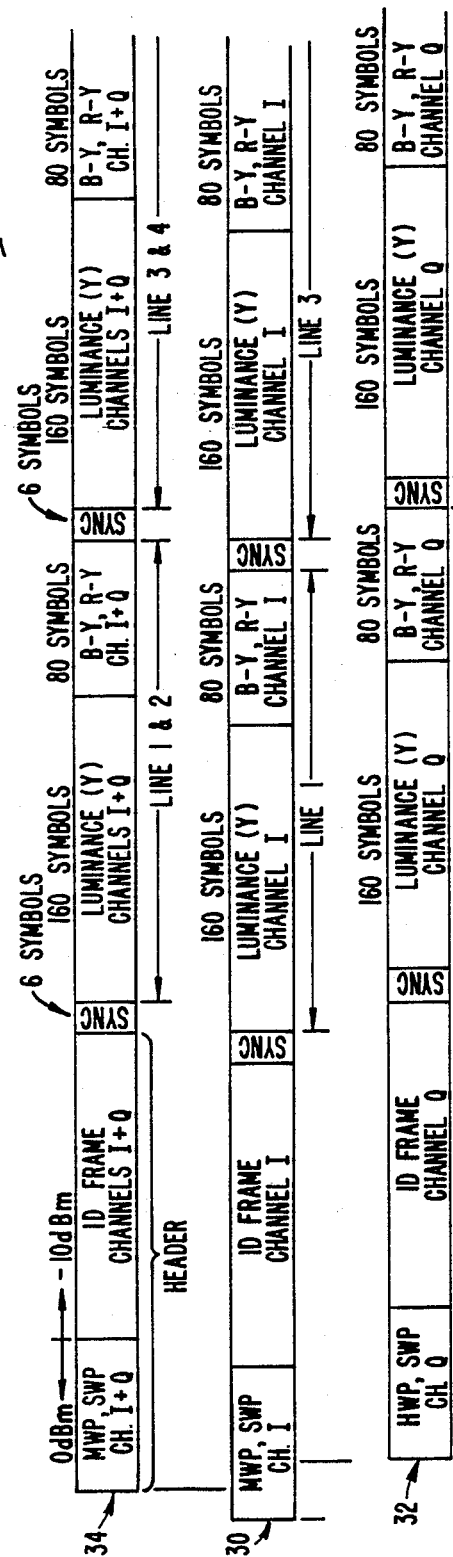

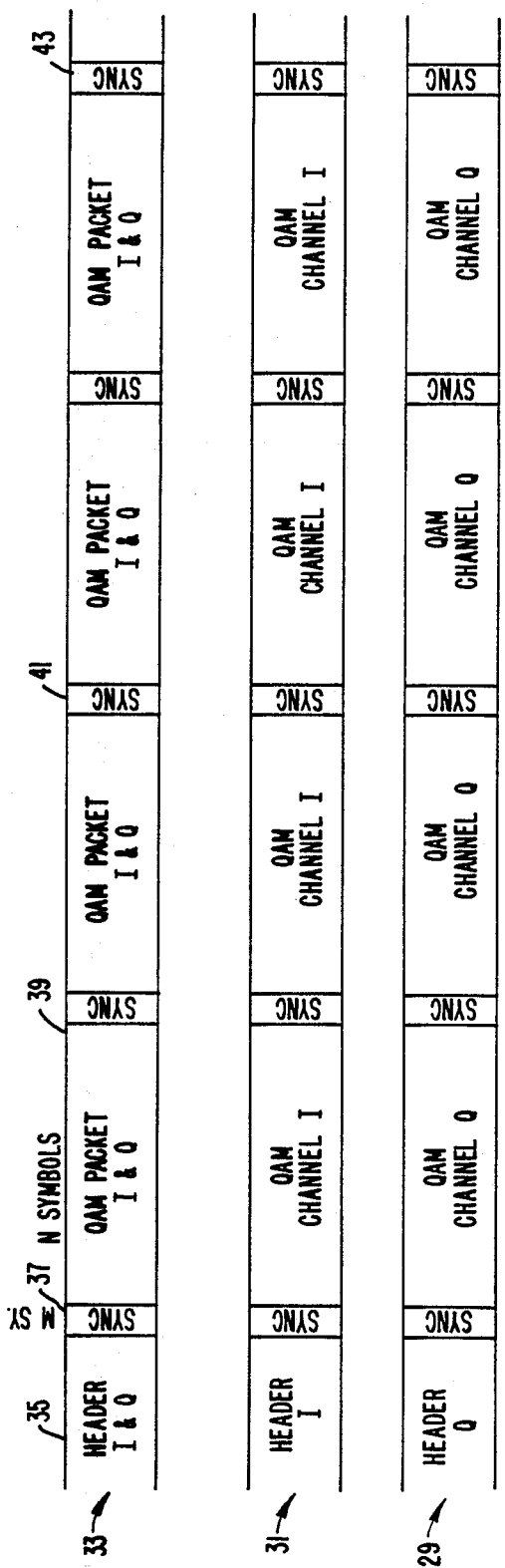
FIG._3A.

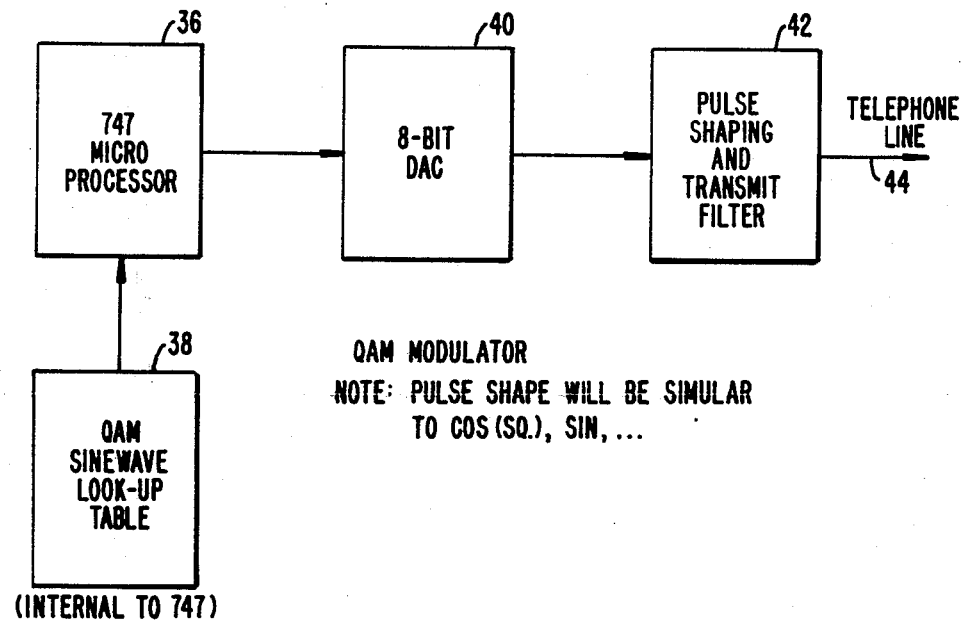
FIG._4.

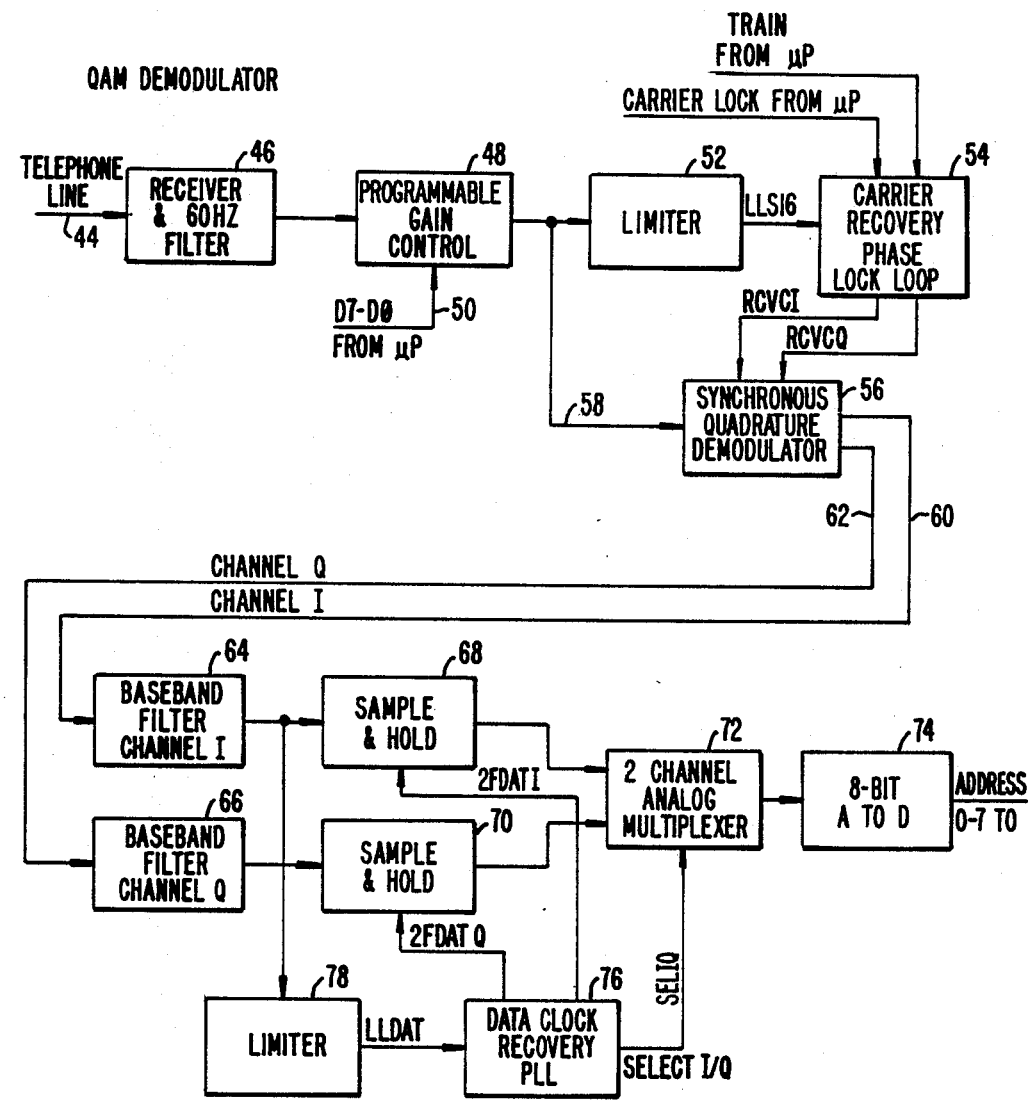
FIG._5.

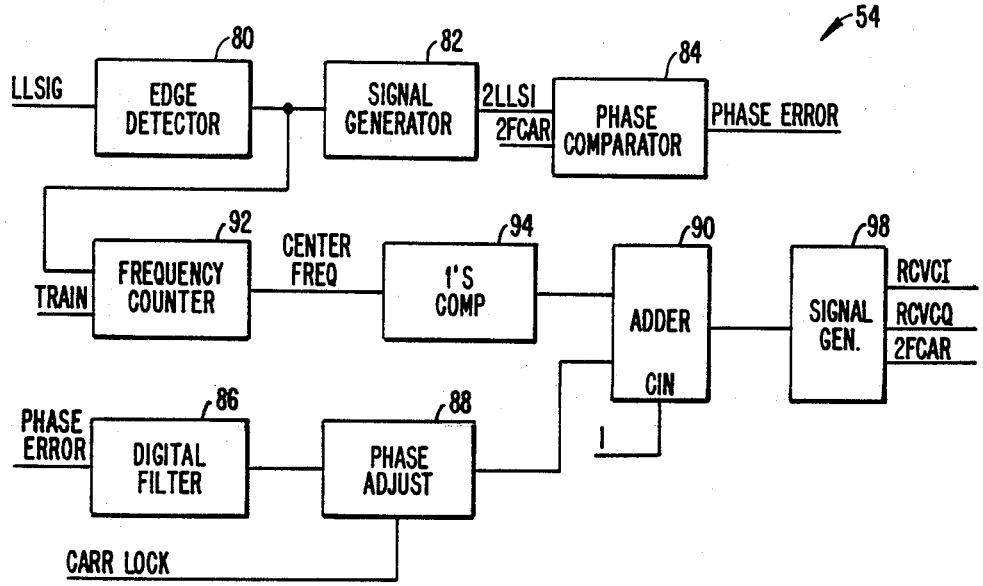
FIG._6.
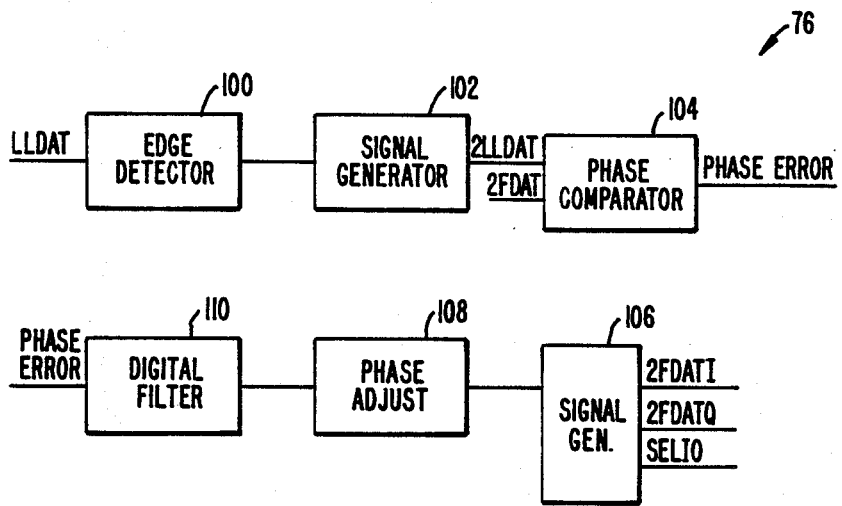
FIG._7.

QUADRATURE AMPLITUDE MODULATION WITH LINE SYNCHRONIZATION PULSE FOR VIDEO TELEPHONE

BACKGROUND

The present invention relates to video transmissions over telephone lines using quadrature amplitude modulation.

For television transmissions of video over the air waves or cable, a dedicated transmission link is present with a wide bandwidth. This allows a modulation method to be used which is not practical for limited bandwidth telephone lines. For each line transmitted in a TV signal, there occurs (1) a horizontal synchronization pulse in the blanking interval between lines, (2) a color burst at the color subcarrier frequency for synchronization, and (3) a summed signal consisting of (a) two color-difference signals on the in-phase (I) and quadrature (Q) channels of a quadrature amplitude modulated (QAM) signal and (b) a subcarrier for the luminance signal. Because the human eye can discern differences in luminance more readily than differences in color, the luminance signal is given a wider bandwidth.

A typical facsimile or telecopy machine uses the limited bandwidth telephone line. The facsimile machine converts a color or gray scale signal into a digital code, which is then transmitted just like any other data over a modem. Each code value is composed of bits of ones and zeros, and an error that changes the value of the one or zero can make a large change in the code value depending on the position of the bit, thus resulting in a large error in the received image. Another facsimile system, shown in U.S. Pat. No. 3,517,117 uses two levels for black and white and varies the width of the pulse for shades of gray.

U.S. Pat. No. 4,739,413 shows a system in which adjacent amplitudes of a sine wave signal correspond to adjacent color or gray scale values, so that an error in amplitude will result in a minor error in the detected signal. The system disclosed shows two phases with multiple amplitude levels so that zero crossings always occur in the same position, allowing easy detection. A QAM transmission could double the amount of data transmitted, but would require a different method because the zero crossings would no longer be distinct.

SUMMARY OF THE INVENTION

The present invention assigns adjacent amplitudes of sine wave cycles in a data packet on I and Q channels of a QAM signal to adjacent color, gray or luminance values. Overlapping sine wave cycles on the I and Q channels in the data packet are assigned to the same or neighboring pixels. A synchronizing signal is sent at the beginning of each transmission of a packet. The synchronizing signal is a plurality of cycles at a maximum amplitude on the I and Q channels. The synchronizing signal serves two functions simultaneously. First, it is used to indicate the beginning of a new packet. Second, the phase of the synchronizing signal is used to initialize the demodulator phase detecting circuitry.

In one embodiment, the synchronizing signal serves a third function. The amplitude of the synchronizing signal is used to calibrate an amplitude detector in a demodulator.

For a gray scale signal, the grays (luminance) are transmitted by placing pairs of neighboring pixels on the I and Q channel.

For color value transmissions, the color pixel data is preferably broken into two blocks, with the first block of packets providing the luminance data for a line and the second block of packets providing the color difference values. Preferably, two video lines are combined on the channels transmitted, with one line being assigned to the I channel and the other line being assigned to the Q channel.

For each sine wave cycle, the I and Q channels contain the information for pixels which are adjacent to each other in the same column or row. Thus, errors in transmission would cause a small change in the neighboring pixel, which is likely to be the same or similar color and/or luminance.

The present invention thus maximizes the amount of video data which can be transmitted over a limited bandwidth telephone line.

The demodulator locks onto the center frequency of the carrier during a header, and uses this center frequency throughout a transmission. Phase error is compensated for only during sync signals, with the phase adjust circuit being disabled by the microprocessor during data packets. Constant synchronization is not required because the data packets are relatively short.

For a fuller understanding of the nature and advantages of the invention, reference should be made to the ensuing detailed description taken in conjunction with the accompanying drawings.

BRIEF DESCRIPTION OF THE DRAWINGS

FIG. 1A is a diagram of an example of pixel to channel assignment;

FIG. 1B is a diagram of the transmission sequence according to the present invention;

FIG. 1C is a diagram of the color difference averaging method;

FIG. 2 is a diagram of a synchronization signal of the present invention;

FIG. 3A is a diagram of the QAM packet scheme showing the QAM packets and sync fields;

FIG. 3B is one embodiment of FIG. 3A for color transmissions;

FIG. 4 is a block diagram of a modulator according to the present invention;

FIG. 5 is a block diagram of a demodulator according to the present invention;

FIG. 6 is a schematic diagram of the carrier clock recovery circuit of FIG. 5; and FIG. 7 is a schematic diagram of the data clock recovery circuit of FIG. 5.

DETAILED DESCRIPTION OF THE PREFERRED EMBODIMENTS

FIG. 1A shows an array 10 of pixels forming an image on a screen. The first row of pixels is numbered 1–160, the second row 161–320, etc. For a QAM transmission, two video lines are transmitted together, with line one being the I channel and line two being the Q channel. Thus, the luminance, color or gray scale information for pixels 1 and 161 are transmitted at approximately the same time (separated by 90° between the two channels). Since these two pixels are immediately adjacent, it is likely that they will have the same or similar values. Accordingly, interference between the two pixels should be minimal.

Before the first packet is transmitted, a preamble or header 12 is transmitted. This is followed by sync signal 14, shown in more detail in FIG. 2 and then the first data packet. This is followed by additional data packets for the remaining video. This sequence is shown in FIG. 1B.

FIG. 2 shows the packet synchronization signal 24 between two data channels. Synchronization signal 24 is composed of an I channel component 26 and a Q channel component 28, both of which are at the maximum amplitude for the sine wave signal. As can be seen, the combination of synchronization signals 26 and 28, which are separated by 90°, results in a combined signal with a phase in between the I and Q channels at 45° from each, with approximately 1.4 times the amplitude. The number and repetition of sine wave cycles for synchronization are related to the length of the data packets, line noise, frequency shift, and system clock accuracy.

FIG. 3A shows the generalized format for a QAM transmission. A Q channel 29, an I channel 31 and a combined channel 33 are shown. The combined channel includes a header 35 and an initial synchronization field 37 which is M symbols long. This is followed by an N symbol QAM packet 39, followed by additional packets with intermediate synchronization fields. Each packet can be encoded with either luminance and/or color information. The I and Q channels are shifted 90° in phase. During the header and synchronization fields, they are of equal amplitude, resulting in a composite wave form shifted 45° and increased amplitude by the square root of 2.

Although the synchronization fields can be placed as desired, it is preferable to have integral number of packets per line of video or group of lines of video, so that every Xth synchronization field corresponds to a start of line and can be recognized as such. For example, each synchronization field could indicate a start of line or alternate synchronization fields, such as fields 37, 41 and 43 could refer to a start of line.

FIG. 3B shows an example of a format for a color transmission. An I channel 30, Q channel 32 and combined channel 34 are shown. The combined channel 34 is simply the superimposition of the I and Q channels. Referring to combined channel 34, it contains a header followed by a synchronization signal. This is followed by luminance information for lines 1 and 2 and then color difference signals for lines 1 and 2. 160 symbols (sine wave cycles) are allocated for the luminance signals, so that, on each channel, a single symbol corresponds to a single pixel. Only 80 symbols are allocated for color difference signals since less resolution is needed (see FIG. 1C). Thus, for each channel, a symbol corresponds to four pixels, such that the color is averaged over four pixels. The color difference signals are B −Y and R −Y, which are calculated in a standard manner (B=Blue, R=Red, Y=Luminance). The color difference packet for lines 1 and 2 is followed by a line synchronization signal for the next line, followed by the luminance and color difference packet for lines 3 and 4.

FIG. 4 is a block diagram of a modulator for the transmission scheme of the present invention. A microprocessor 36 receives the pixel data from a camera or other video source and stores it in a memory (not shown). The amplitude and phase of a QAM sine wave signal for a particular pixel value is determined from a digital look-up table 38 by microprocessor 36. This value is then applied to a digital-to-analog converter 40 to put the sine wave cycle in analog form. A pulse shaping and transmit filter 42 smooths the signal for transmission over a telephone line 44.

FIG. 5 shows a demodulator corresponding to the modulator of FIG. 4. A receiver and filter 46 receives the signals from telephone line 44. These are provided to a programmable gain control circuit 48, which is programmed by a microprocessor via control lines 50. The microprocessor could be the same one used for the modulator of FIG. 4.

A limiter 52 detects the zero crossing points of the received signal during the header and synchronization fields and provides a digital signal representative of such points (LLSIG). This signal is used by a Carrier Recovery Phase Lock Loop 54 to adjust the demodulation signals (RCVCI & RCVCQ) so that they are in phase with the incoming signal for proper demodulation to obtain accurate received data.

Carrier Recovery PLL 54 returns two signals to a demodulator 56, RCVCI for demodulating the I channel and RCVCQ for demodulating the Q channel. These signals are 90 degrees out of phase with each other. During synchronization, these signals are 45 degrees out of phase with respect to the incoming signal (which is made up of equal amplitude values on the I and Q channels).

The phase lock process is only performed during the header and during the sync pulses since the zero crossings during the QAM data packets are not predictable. This activation of PLL 54 is performed by the microprocessor as it counts the sync symbols and thus knows when to set Carr Lock (see FIG. 6) to lock to the current phase setting.

The RCVCI and RCVCQ signals are used by synchronous quadrature demodulator 56 to chop (or multiply) the incoming signal on line 58 to obtain two signals on lines 60, 62. These two obtained signals are each passed through a baseband filter (64, 66) to limit carrier bleedthru and are then fed to sample and hold circuitry (68, 70). A two channel analog multiplexer 72 then directs them to an analog to digital converter 74 where the microprocessor obtains the corresponding digital representation of their values.

The correct sampling of the data is determined by the signals 2FDATI, 2FDATQ, and SELIQ. These signals are provided by a Data Clock Recovery Phase Lock Loop 76. This PLL is very similar to the Carrier Recovery Phase Lock Loop 54 except that it utilizes a signal LLDAT as the incoming signal to lock to and it is always running—it is never locked by the microprocessor. LLDAT is a digital signal produced by a limiter 78 that represents a clock of the incoming data.

Carrier recovery PLL 54 is shown in more detail in FIG. 6. To adjust the phase, Carrier Recovery PLL 54 generates two signals; one is twice the frequency of the incoming carrier and in phase with it (2LLSI), the other reference signal (2FCAR) is twice the frequency of the demodulation signal (RCVC). The 2LLSI signal is produced from the LLSIG signal (received from limiter 52) by an edge detector 80 and a signal generator 82. These two signals are compared in a phase comparator 84 to calculate the difference in phase between the incoming (LLSI) and demodulation signal (RCVC). This error is low pass filtered in a digital filter 86 to minimize the impact of noise and jitter and then used to generate a phase correction factor by phase adjust circuit 88. The CARR_LOCK signal is produced by the microprocessor to enable phase adjust circuit 88 only during sync signals.

The phase correction factor is added in an adder 90 to a center frequency value produced by a frequency counter 92 and a 1's complement circuit 94. The phase correction factor is then fed to a signal generator 98 to adjust the phase of the demodulation (RCVC) and reference (2FCAR) signals. This process is repeated over multiple received signal cycles until the phase error is adjusted to a minimum.

A unique aspect of the Carrier Recovery Phase Lock Loop is its ability to train on the incoming frequency. By providing a sequence of at least 32 sync pulses (most likely as part of the header) and setting the TRAIN signal, PLL 54 is able to calculate the incoming frequency and makes all phase adjustments from this reference. The TRAIN signal is produced by the microprocessor to enable the center frequency calculation when the 32 sync pattern begins. This ability is necessary for proper QAM demodulation since frequency shift from the phone line would otherwise cause the demodulation signals (RCVCI and RCVCQ) to be offset from the ideal demodulation point and the point would drift during lock. Frequency counter 92 counts the frequency for 64 half-cycles and then divides by 64 to give the center frequency. This value is then latched for the entire transmission.

Data clock recovery PLL 76, shown in FIG. 7, is similar to carrier recovery PLL 54 of FIG. 6. The received signal (LLDAT) is processed through an edge detector 100 and signal generator 102, and then is fed to a phase comparator 104. LLDAT transitions whenever a phase change occurs in the data on the I channel. As described above for PLL 54, PLL 76 compares two signals that are twice the normal data rate and minimizes the phase error by making adjustments to a signal generator 106 through phase adjust circuit 108, which receives the phase error signal filtered in filter 110. Signal generator 106 provides 2FDATI and 2FDATQ. These signals control the sample and hold circuits (68, 70 of FIG. 5) and informs the microprocessor when to read the analog to digital converter. Signal SELIQ is simply a combination of 2FDATI and 2FDATQ used to control two channel analog multiplexer 72.

As will be understood by those familiar with the art, the present invention can be embodied in other specific forms without departing from the spirit or essential characteristics thereof. For example, the modulating values can be generated by analog circuitry rather than a look-up table. Accordingly, the disclosure of the preferred embodiment of the invention is intended to be illustrative, but not limiting, of the scope of the invention which is set forth in the following claims.

What is claimed is:

1. A method for transmitting data corresponding to pixels in a video image over a telephone line using quadrature amplitude modulation (QAM) with in-phase (I) and quadrature (Q) channels, comprising the steps of;
   assigning adjacent amplitudes of sine waves in a data packet on said I and Q channels to adjacent color, gray or luminance values;
   assigning overlapping sine wave cycles on said I and Q channels in said data packet to the same or neighboring pixels;
   transmitting a synchronizing signal at the beginning of each transmission of a data packet, said synchronizing signal being a plurality of cycles on said I and Q channels; and
   initializing a demodulator to the phase of said synchronizing signal.

2. The method of claim 1 wherein said synchronizing signal is at a maximum amplitude, and further comprising the steps of calibrating a demodulator amplitude detector to said maximum amplitude of said synchronizing signal.

3. The method of claim 1 wherein said adjacent amplitudes are assigned to adjacent shades of gray, with black and darker shades of gray having a first phase and white and lighter shades of gray having a second phase.

4. The method of claim 1 wherein color information is transmitted, with luminance data being transmitted first, followed by color difference data, said luminance data for the pixels in a first line being transmitted sequentially on the I or Q channel, with the luminance data for the pixels on a second adjacent line being transmitted sequentially on the other channel, followed by average color difference data from lines 1 and 2 being transmitted sequentially on I and Q channels for said first and second lines.

5. The method of claim 4 wherein a greater number of cycles are assigned to said luminance data than to said color difference data.

6. The method of claim 1 wherein every nth synchronizing signal indicates the beginning of a new line.

7. A system for transmitting data corresponding to pixels in a video image over a telephone line using quadrature amplitude modulation (QAM) with in-phase (I) and quadrature (Q) channels, comprising:
   means for assigning adjacent amplitudes of sine waves in a data field on said I and Q channels to adjacent color, gray or luminance values;
   means for assigning overlapping sine wave cycles on said I and Q channels in said data field to the same or neighboring pixels;
   means for transmitting a synchronizing signal at the beginning of each transmission of a QAM data packet, said synchronizing signal being a plurality of cycles on said I and Q channels; and
   means for initializing a demodulator to the phase of said synchronizing signal.

8. The system of claim 7 wherein said synchronizing signal is at a maximum amplitude and further comprising means for calibrating a demodulator amplitude detector to said maximum amplitude of said synchronizing signal.

9. The system of claim 7 further comprising:
   means for transmitting a carrier frequency initialization signal;
   means for determining an average center frequency from a received carrier frequency initialization signal; and
   a microprocessor for detecting said carrier frequency initialization signal and enabling said means for determining only during said initialization signal.

10. The system of claim 7 wherein said means for initializing comprises a phase lock loop (PLL) and further comprising a microprocessor for detecting said synchronizing signals and enabling said PLL only during said synchronizing signals.

11. The system of claim 7 wherein said means for assigning adjacent amplitudes comprises a memory look-up table and said means for assigning overlapping sine wave cycles comprises a microprocessor.

* * * * *